April 8, 1969 F. A. BROCK ET AL 3,437,170
CONTROL OF ENERGY SPECTRUM IN MARINE SEISMIC EXPLORATION
Filed Dec. 12, 1966 Sheet 1 of 2

INVENTORS:
FRED A. BROCK
ROY C. JOHNSTON

ATTORNEY 3,437,170
CONTROL OF ENERGY SPECTRUM IN MARINE
SEISMIC EXPLORATION
Fred A. Brock, Dallas, and Roy C. Johnston, Richardson,
Tex., assignors to Texas Instruments Incorporated, Dallas, Tex., a corporation of Delaware
Filed Dec. 12, 1966, Ser. No. 601,092
Int. Cl. G01v 1/38; G10k 11/00; H04b 13/02
U.S. Cl. 181—.5                                 12 Claims

ABSTRACT OF THE DISCLOSURE

Seismic waves for marine operations generated by producing radiating bubbles at spaced locations where bubbles are of different sizes to oscillate at different frequencies for control of the energy level as a function of frequencies preferably at least three bubbles are employed with at least two bubbles located close enough to coalesce and one other bubble spaced sufficiently to prevent coalescence.

Field of the invention

This invention relates to underwater seismic exploration, and more particularly, to a method and system for generating seismic waves with control of the power spectra by multiple acoustic energy sources.

Description of the prior art

In marine seismic exploration, it has been the practice to create a seismic event by detonating an explosive charge or by generating gaseous explosions. More recently, methods for concentrating energy in a particular frequency band to produce a more effective seismic event have been developed. Electrical discharge systems are employed for generating an underwater spark which results in an acoustic pulse with a power spectrum that to some extent can be varied by changing the electrical parameters of the energy-discharge system. Such sources are generally broad band and inefficient with reference to the narrow frequency band of interest in seismic exploration.

Summary of the invention

The present invention is directed to adjustment of the power spectra of underwater acoustic signals by controlling the volumes and/or relative locations of gas bubbles produced by multiple sources. A gas bubble generated by an underwater acoustic energy source oscillates with a fundamental frequency and amplitude determined by the characteristics of the source and the boundary conditions of the surrounding liquid. The size of the bubble and its fundamental frequency of oscillation can be determined for any source under its particular boundary and initial conditions. The power spectrum that the bubble generates is a function of its size. The term energy spectrum as used herein refers to the level in decibels of the acoustic energy at frequencies within a range of frequencies. By simultaneously creating bubbles of different known volumes, a wavelet having a particular energy spectrum of interest can be produced. In accordance with this invention, bubbles of different known volumes are produced from several sources to produce bubbles preferably which coalesce after generation. The latter method produces a bubble whose characteristics are readily predictable.

Further in accordance with the present invention, a plurality of sources are employed to produce a plurality of bubbles at locations spaced apart one from the other where at least two bubbles coalesce to form a single bubble.

Description of the drawing

For a more complete understanding of the present invention and for further objects and advantages thereof, reference may now be had to the following description taken in conjunction with the accompanying drawings in which.

Description of the preferred embodiment

Figure 1:
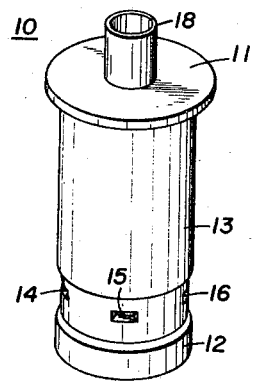
FIGURE 1 is an isometric view of a mechanical source for producing a bubble.

Referring now to FIGURE 1, an underwater acoustic energy source 10 of an air gun type has been shown. It is comprised of an upper and lower housing 11 and 12 interconnected by a cylinder 13 which has four exhaust ports, three of which, the ports 14, 15 and 16, being shown in FIGURE 1. The ports are located around the periphery of cylinder 13 near the lower end thereof and at right angles to each other. Atop the upper housing is an entrance conduit 18 for air and electrical connections. Such an air gun is designed to have a predetermined chamber volume, such as 3 and 10 cubic inches in one configuration, and 200 and 600 cubic inches in another configuration. Examples of such guns are those manufactured and sold by Bolt Associates Inc., East Norwalk, Conn.

Figure 2:
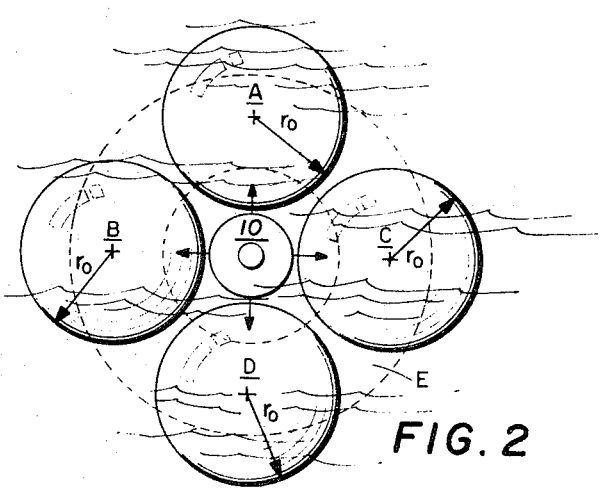
FIGURE 2 illustrates bubble production by a source shown in FIGURE 1.

Upon triggering such a gun to open ports therein, four bubbles A–D will be produced which coalesce to form a single approximately toroidial bubble E as shown by the dotted outlines in FIGURE 2. The maximum radius of bubbles A–D produced by such an underwater acoustic energy source can be approximated by the equation $$r_o = \frac{3}{4\pi}\left[\frac{P_c V_c}{P_o}\right]^{1/3}$$

where:

$P_o$=absolute hydrostatic pressure at depth of source
$P_c$=initial chamber pressure (absolute) of source
$V_c$=¼ of the total chamber volume of source
$r_o$=maximum bubble radius
$\pi$=3.14159

Figure 3:
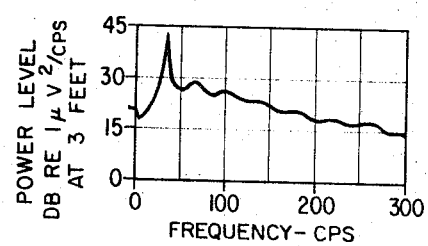
FIGURE 3 is the power spectrum generated by the source system of FIGURE 1 under boundary and initial conditions.

The bubbles A–D produced by gun 10 coalesce to oscillate as a single bubble E having a certain fundamental frequency of oscillation. An example power spectrum produced by such a gun is shown in FIGURE 3. It will be noted that under boundary and initial conditions, peak power is developed primarily in a narrow band of from 30 to 40 cycles per second. About one-third of the acoustic energy is concentrated in about 5 c.p.s. centered about the peak in the power spectrum, i.e., at the fundamental frequency of bubble oscillation.

Figure 4:
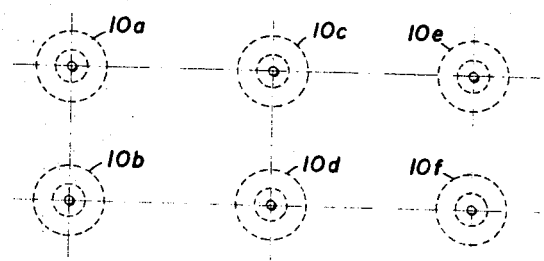
FIGURE 4 shows a grouping of bubble sources.

FIGURE 4 shows a group of six sources 10a–10f spaced so that the bubble from each source oscillates independently. The resulting power spectrum of the six guns fired simultaneously is about the same as for the firing of a single gun, except that the energy level is 6 times, or about 7.8 decibels, higher at each frequency.

Figure 5:
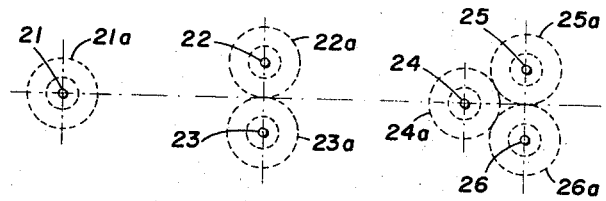
FIGURE 5 illustrates another grouping of bubble sources.
Figure 6:
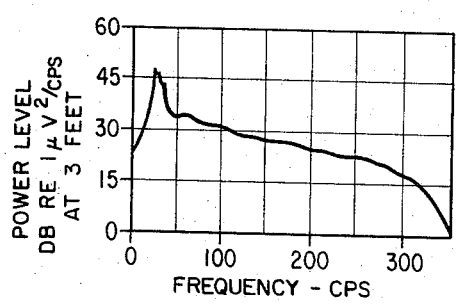
FIGURE 6 is the power spectrum produced by the grouping of bubble sources as shown in FIGURE 5.

A broader frequency band is highly desirable for seismic operations and may be achieved in accordance with the invention. In accordance with one embodiment of the invention, sources 21–26 are arranged as shown in FIGURE 5 to form three groups of sources. The bubble 21a formed from source 21, does not coalesce with any other source and thus oscillates independently of them and at a frequency determined by its size. The bubbles 22a–23a formed in one group 22–23 will coalesce and the common bubble oscillates in a mode peculiar to its size. The bubbles 24a–26a from sources 24–26 are so spaced that they will coalesce and the common bubble oscillates in a mode peculiar to its size. The fundamental frequency of the bubbles from sources 24–26 is lower than the fundamental frequency of the bubbles from sources 22–23 and the bubble 21a from source 21 has a frequency lower than either of the other groups where coalescence occurs. The bubble produced by sources 24–26 is three times larger than the separate bubble produced by source 21 and the bubble produced by sources 22–23 is two times larger than the separate bubble produced by source 21. The power spectrum of the signal resulting from the grouping of FIGURE 5 is illustrated in FIGURE 6. Note that the power spectrum has been considerably broadened.

Figures 7, 8:
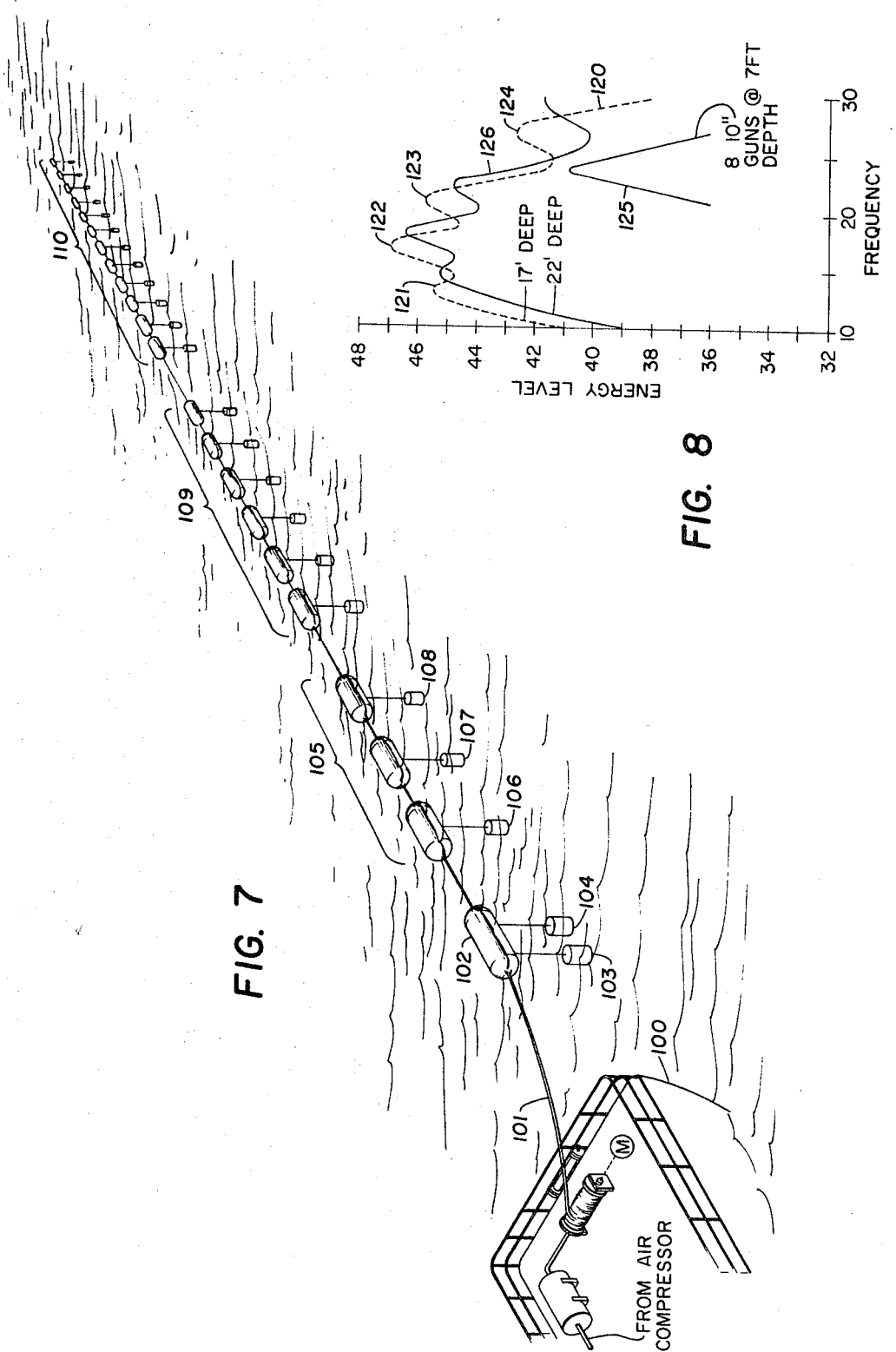
FIGURE 7 illustrates a preferred embodiment of the invention.
FIGURE 8 illustrates the power spectrum from the system of FIGURE 7.

Having described the invention in connection with FIGURES 1–6, reference should now be had to FIGURES 7 and 8 which illustrate the preferred embodiment. In FIGURE 7, a plurality of floats are towed behind a vessel 100. The line 101 leading from the vessel 100 will include compressed air hose. In this embodiment, twenty-three floats are coupled in tandem. They are towed in tandem at space points along line 100. Float 102 provides support for a pair of air guns 103 and 104. Guns 103 and 104 preferably are spaced such that the bubbles produced upon actuation of the guns will coalesce. Three floats 105 support guns 106, 107, 108 spaced one from another such that the bubbles produced thereby will not coalesce. Six floats similarly support gun 109 at spaced locations so that the bubbles produced thereby will not coalesce. Finally, twelve floats support guns 110 spaced such that the bubbles produced thereby will not coalesce. In this embodiment, the two guns 103 and 104 are preferably of 40 cubic inch capacity. Similarly 106–108 are 40 cubic inch guns. The guns 109 preferably are 20 cubic inch guns. The guns 110 preferably are 10 cubic inch guns. In this system, the total volume of 400 cubic inches is provided. The guns were located at a depth preferably 10′ or more below the water surface.

FIGURE 8 illustrates the energy spectrum resulting from simultaneous actuation of all of the guns of FIGURE 7. In this system, energy level has been plotted as a function of frequency. The dotted curve 120 represents the energy spectrum produced by charging the guns of FIGURE 7 at a pressure of 1900 p.s.i.g. and supporting the guns at a depth of 17 feet below the surface. The first peak 121 is the energy resulting from the single bubble produced by coalescence of bubbles from guns 103 and 104. Peak 122 results from the bubbles from guns 106–108. Peak 123 results from energy produced by the six bubbles from guns 109. Finally, peak 124 results from bubbles produced from guns 110.

This energy-frequency spectrum may be compared with the energy-frequency spectrum produced by the simultaneous detonation of eight guns at a 7 foot depth wherein the resultant energy spectrum is illustrated by the curve 125. It will be seen that by using a plurality of guns which produce bubbles of different sizes, a much broader energy frequency spectrum is produced.

In order to illustrate the effect of variation in depth, a second curve 126 has been produced in FIGURE 8 which illustrates the results of tests with the same system as used for curve 120 but with the guns located at a depth of 22 feet. It will be apparent that the selection of the sizes of the units, the spacings therebetween and the depth at which they are supported may be varied to provide wide latitude in the control of the energy frequency spectrum.

While the foregoing description has centered around the use of compressed air sources, it will be appreciated that the invention may be employed in connection with the detonation of explosive sources, either by detonating quantities of combustible gas or the use of high explosives. In any such case, at least two sources will be employed to produce bubbles of different sizes. Preferably, a minimum of three sources will be used with two of them spaced such that bubbles produced thereby will coalesce to form a single bubble the size and character of which may be different from that produced by the third source. The third source may be spaced from the other two a sufficient distance as to make certain that the bubble produced by the third source will not coalesce with the bubbles produced by the first two sources. The sources will be simultaneously actuated. The character of the energy-frequency content of the pressure waves produced by the coalesced bubble may be different from that of the third bubble. Preferably patterns of sources will be employed where the bubbles ultimately produced differ in size in a manner designed to control the energy-frequency spectrum. For this purpose, compressed air guns of sizes ranging from 10 cubic inches to 600 cubic inches and greater employed in combinations will provide sound waves having a power spectrum tailored to a given need.

What is claimed is:

1. In marine seismic exploration, the method of control of the energy-frequency spectrum of a seismic pulse which comprises,
    (a) producing at least one abrupt release of gas at a first point below the water surface to create a first gaseous bubble which has a first energy-frequency character, and
    (b) simultaneous with creation of said first bubble producing at least a second and a third abrupt release of gas to produce a second and a third bubble with spacings from each other and from said first bubble to cause said second and third bubbles to coalesce without coalescence with said first bubble to form a single bubble of energy-frequency character different from that of said first bubble.

2. In marine seismic exploration, a system for producing seismic waves of controlled energy-frequency spectrum which comprises:
    (a) a vessel adapted to move along a marine traverse,
    (b) a trailing float structure adapted to be towed behind said vessel,
    (c) a plurality of gas sources depending from said float structure at a predetermined depth, said sources being adapted to produce gas bubbles of different sizes and with at least two of said gas sources being spaced to assure coalescence of the bubbles produced thereby and with at least one of said sources spaced from the others to prevent coalescence of the bubble produced thereby with any other bubble.
    (d) means for simultaneously actuating all of said sources, and
    (e) said sources being adapted to produce bubbles of decreasing size in accordance with the series 40–20–10 and wherein at least two of said sources of relative size 40 are spaced to assure coalescence of the bubbles produced thereby and the remainder are spaced to prevent coalescence.

3. In marine seismic exploration, the method for generating a seismic pulse having a controlled power spectrum which comprises simultaneously producing a plurality of bubbles below the water surface by the abrupt release of predetermined quantites of gas at points separated by a distance sufficient to prevent dissipation of the useful energy by migration of one bubble toward the other, at least one of the bubbles being produced by the simultaneous production of a plurality of bubbles spaced in a pattern such that the bubbles coalesce to form a single bubble the quantities of gas being seelcted to produce bubbles having at least two different energy-frequency characteristics whereby a seismic pulse having a combined power spectrum broader than the power spectrum produced by a bubble of either energy-frequency characteristic will be produced.

4. The combination as set forth in claim 3 wherein the bubbles are produced by the abrupt release of compressed gas.

5. The method of claim 3 wherein said gas is released by the detonation of a plurality of explosive charges.

6. The system for generating a marine seismic pulse having a broadened power spectrum comprisng:
  a plurality of bubble means each adapted to produce a bubble by the abrupt release of gas at a point below the water surface, at least one of said bubble means producing a bubble by the simultaneous production of a plurality of bubbles spaced in a pattern such that the bubbles coalesce to form a single bubble,
  at least two of said bubble means being displaced by a distance sufficient to prevent coalescence of the bubbles produced thereby,
  said spaced bubble means being adapted to produce bubbles having different energy-frequency characteristics to produce a combined power spectrum broader than the power spectrum produced by a bubble from either of said bubble means when activated simultaneously, and
  means for simultaneously activating the bubble means to simultaneously produce bubbles at the respective points.

7. The system defined in claim 6 wherein the bubble means comprises means for abruptly releasing a predetermined volume of compressed gas into the water.

8. The system defined in claim 6 whtrein each of the bubble means comprises an explosive charge.

9. A system for marine seismic exploration comprising:
  (a) a vessel adapted to move along a marine traverse,
  (b) a float structure towed behind said vessel,
  (c) a plurality of gas sources suspended from said float structure at a predetermined depth,
  (d) said sources being adapted to abruptly release at least two different volumes of gas upon actuation,
  (e) at least two of said gas sources being horizontally spaced such as to assure coalescence of the bubbles produced thereby
  (f) at least one of said gas sources being spaced from the others to prevent coalescence of the bubble produced thereby with any other bubble, and
  (g) means for simultaneously actuating all of said gas sources.

10. The system defined in claim 9 wherein each of said gas sources comprises:
  (a) a compressed gas container,
  (b) means for abruptly releasing compressed gas from the compressed gas container, and
  (c) gas compression means carried by said vessel and connected to supply compressed gas to said gas containers.

11. The method for controlling the frequency spectra of seismic waves which comprises creating at least two bubbles below the surface of a body of water by abruptly and substantially simultaneously releasing different volumes of compressed gas from chambers spaced by a distance sufficient to prevent coalescence of at least two of the bubbles, at least one of the bubbles being produced by gas released from each of at least two chambers disposed sufficiently close that the gases from the chambers coalesce to produce a single bubble.

12. The method for controlling the frequency spectra of seismic waves which comprises creating at least two bubbles of decreasing size, each size bubble having approximately half the volume of the next larger sized bubble, below the surface of a body of water by abruptly and substantially simultaneously releasing different volumes of compressed gas from chambers spaced by a distance sufficient to prevent coalescence of at least two of the bubbles.

References Cited

UNITED STATES PATENTS

| | | | |
|---|---|---|---|
| 2,771,961 | 11/1956 | Blake | 181—0.5 |
| 3,246,286 | 4/1966 | Barry | 340—7 |
| 3,276,534 | 10/1966 | Ewing et al. | 181—0.5 |
| 3,322,232 | 5/1967 | Chalmers et al. | 181—0.5 |
| 3,249,177 | 5/1966 | Chelminski | 181—0.5 |
| 3,307,285 | 3/1967 | Wells | 340—3 |
| 3,310,128 | 3/1967 | Chelminski | 1—1 |

BENJAMIN A. BORCHELT, *Primary Examiner.*

JAMES FOX, *Assistant Examiner.*

U.S. Cl. X.R.

340—7